United States Patent [19]

Krutz et al.

[11] 3,757,131

[45] Sept. 4, 1973

[54] EMERGENCY POWER SWITCHING CIRCUIT FOR COUNTERS

[75] Inventors: Ronald L. Krutz; Thomas J. Villella, both of Pittsburgh, Pa.

[73] Assignee: Gulf Research & Development Company, Pittsburgh, Pa.

[22] Filed: June 2, 1972

[21] Appl. No.: 259,273

[52] U.S. Cl. .................................. 307/64, 307/66
[51] Int. Cl. .............................................. H02j 9/06
[58] Field of Search ........................... 307/64–66, 44–46, 205, 217; 315/86

[56] References Cited
UNITED STATES PATENTS

| | | | |
|---|---|---|---|
| 3,249,769 | 5/1966 | Mierendorf | 307/64 X |
| 3,273,042 | 9/1966 | Tuszynski | 307/45 X |
| 3,289,097 | 11/1966 | Martin | 307/64 X |
| 3,319,074 | 5/1967 | Koch | 307/46 X |
| 3,356,855 | 12/1967 | Suzuki et al. | 307/44 |
| 3,509,357 | 4/1970 | Studtmann | 307/64 |

*Primary Examiner*—William M. Shoop, Jr.
*Attorney*—Meyer Neishloss et al.

[57] ABSTRACT

A circuit positioned between an array of a normal power supply and an emergency power supply, a source of pulses to be counted, and at least one counter for counting said pulses, which circuit serves the functions of smoothly isolating the counter from the pulse source in the event of a failure of the normal power supply to hold the count on the counter. When normal power returns, the circuit waits for the pulse source to stabilize and then reconnects the counter to the pulse source. All operations are performed without losing or gaining any counts on the counter.

9 Claims, 2 Drawing Figures

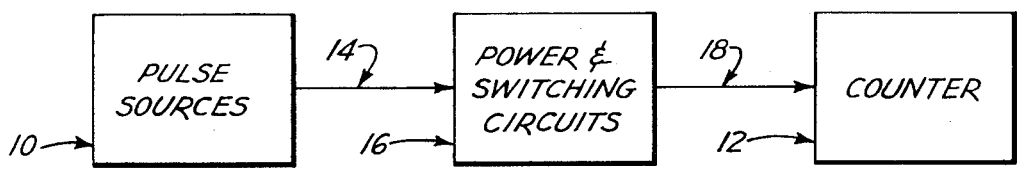
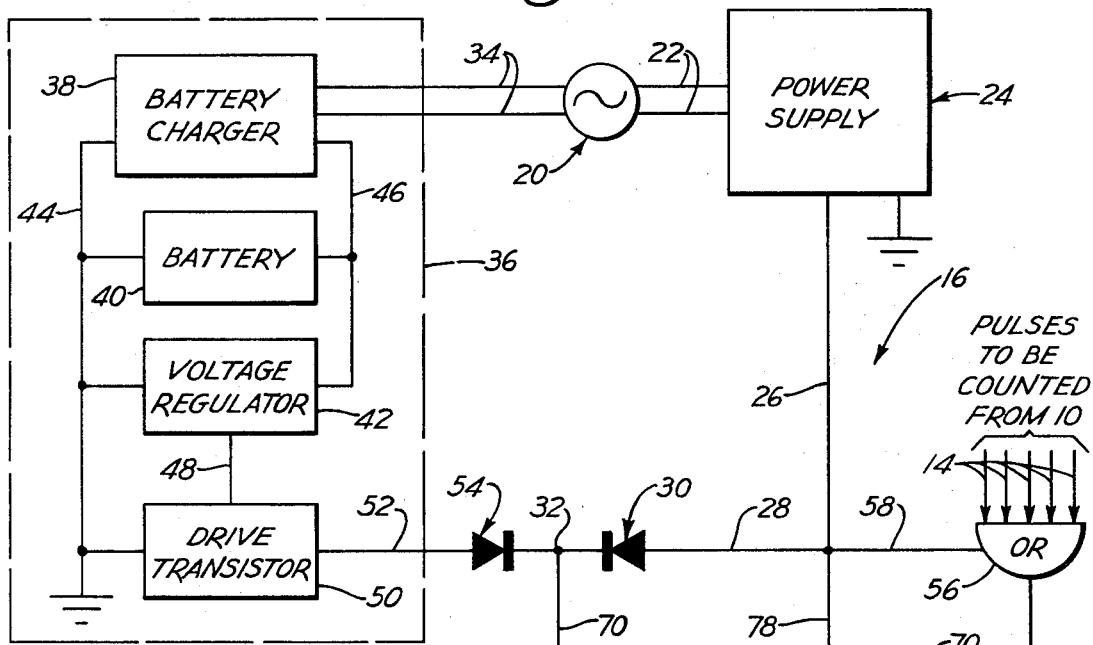
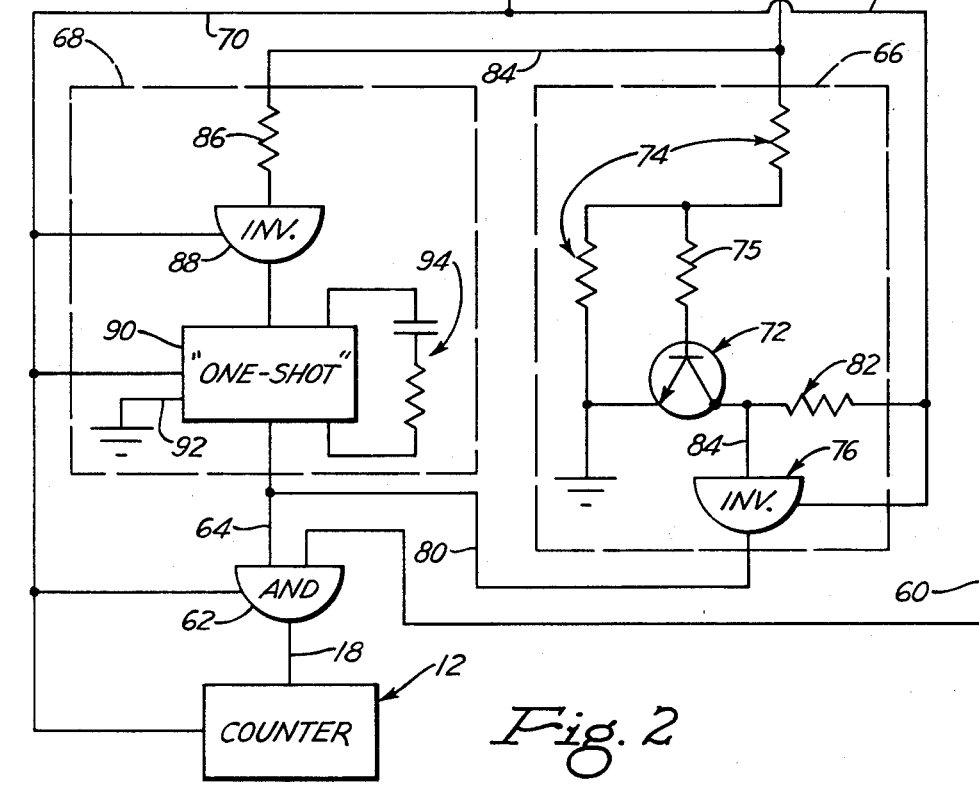

EMERGENCY POWER SWITCHING CIRCUIT FOR COUNTERS

This invention relates to means to hold a utility being serviced stable, such as protecting the integrity of a count on counting means, in the event of a failure of a normal power supply. More in particular, the invention pertains to such a circuit interposed between a counter, a source of pulses to be counted, and an array of a normal power supply and an emergency power supply for the circuit and counter.

A feature of the invention is that it only seeks to preserve the count on the counter, i.e., hold the utility stable, and not to supply sufficient power to maintain normal operation during the failure of the primary power supply. This fact is important in that it permits the use of a relatively small and inexpensive stand-by system. A great deal more stand-by power and expensive equipment would be needed to fully drive the pulse source and the invention in normal operation, and such systems are not within the scope of the invention. The invention may operate with many different pulse sources, and thus the pulse source is a part of the environment of the invention, and not per se a part of the invention.

The present invention was developed in the environment of automated gasoline dispensing pumps, wherein a power failure would shut down the motors in the pumps, thus preventing further sales of gasoline. In the event of such a power failure, the invention serves to maintain the integrity of the counts on the various counters associated with the sale of gasoline. The invention may be used in other environments having similar considerations and problems wherein a counter or some other electronic component is to be held at a steady condition during a failure of a primary power supply and during the switching back and forth between the primary and secondary supplies at the beginning and end of the power failure.

Another facet of the invention is that it avoids the problems of loss or gain of count which could arise during the confused transition periods when the circuitry is switched to emergency power, and when it is later switched back to normal power. In prior art systems it is possible for the counter or other utility to sense pulses which are not in fact data pulses to be counted but are rather spurious pulses caused by the act of switching the circuitry between the power supplies in either direction. Thus, the invention provides a circuit arrangement to permit such switching between power supplies in such a manner that the counter or other utility being serviced does not sense that power has changed, or at least does not sense any abnormalities sufficient to trigger such counter or other utility to mistake the acts of switching for data pulses to be counted.

Yet another feature of the invention is that the normal power supply and the emergency power supply are connected together in parallel to a common junction point via a diode array in such a manner that the normal power supply powers the subsequent circuitry because of a slight overpower with respect to the emergency supply. In the event of a failure in the normal supply, the diode array automatically causes the emergency supply to power the counter and key parts of the circuit. The emergency supply is held at approximately the desired operating voltage of the subsequent components. Thus, the remaining circuitry after the common junction point does not sense the change in power supply, but merely senses the loss of the normal power supply overpower, which does not effect operation of the remaining circuitry.

Generally, the invention can work in any application where digital signals are transferred from one circuit or part of a circuit to another circuit or part of a circuit and the source of the signals may lose power whereas the destination of the signals will not lose power. Looked at another way, the invention has utility whenever standby power must be transferred to only a portion of a circuit upon power failure. This creates the problem of the part of the circuit which is losing power producing random, false pulses and sending them to the part of the circuit which is on standby power. This is especially true if the circuit on standby power is sensitive to spurious pulses, such as a high speed counter.

The above and other advantages of the invention will be pointed out or will become evident in the following detailed description and claims, and in the accompanying drawing also forming a part of the disclosure, in which:

FIG. 1 is a highly stylized logic diagram showing a general environment in which the invention may be used; and FIG. 2 is an electrical schematic diagram of the preferred embodiment of the circuit of the invention.

Referring now to FIG. 1, reference numeral 10 indicates a source or sources of pulses to be counted by the counter or counting means 12. The pulses are transmitted from block 10 via line 14 through the power and switching circuits 16 of the invention, and thence via a line 18 to the counter 12.

The "lines" 14 and 18 of FIG. 1, and certain of the other "lines" on FIG. 2, and the word "line" as used herein generally, may often actually represent a plurality of conductors, as is obvious to those skilled in the art, see for example, the right side of FIG. 2 with regard to "line" 14. The word "utility" as used in the specification and claims herein, shall be understood to mean any device with which the invention may operate in order to maintain said device in a stabilized or steady condition during a power failure. Most frequently, it is anticipated, the "utility" 12 will be a counter or the like.

In the environment in which the invention was developed, the source 10 was a transducer associated with the flow shaft of a retail gasoline marketing pump, and it produced 10 pulses per gallon of gasoline dispensed. The counter 12 was conventional means for counting the electrical pulses, and thereby counted the number of gallons of gasoline dispensed, to the nearest one-tenth of a gallon. The same pulses, through other circuitry, were made to correspond to money value of gasoline dispensed, and other counting means kept a tally of the monetary value of the gasoline dispensed by the pump. For further details about an environment in which the invention may be used, reference may be had to our U.S. Pat. No. 3,598,283, issued Aug. 10, 1971, entitled "Gasoline Pump Computer." In other environments, the raw pulses could correspond to other data, and other counting means could be used, all as will be evident to those skilled in the art.

The "black box" 16 embodying the invention is located between the elements represented at 10 and 12 to assure that, in the event of a failure of normal power to the blocks 10, 12 and 16, then reserve power could be called upon to hold utility 12 steady, although not for the purpose of powering element 10 and the other elements in the normal manner. The invention, as will be set forth in detail below, also provides means to assure a smooth transition between the normal power supply and the standby power supply back and forth as normal power first fails and is later restored, all in a manner so as to hold utility 12 in a steady undisturbed condition, i.e., maintain the integrity of the data count on counter 12 and not generate any false pulses and not lose any of the count.

Referring now to FIG. 2, reference numeral 20 indicates conventional line power, typically 115 VAC. A first pair of lines 22 supplies line power to a conventional power supply means 24 which comprises the normal power supply for the remaining circuitry. A normal power supply line 26, having many branches described further below, normally powers many parts of the circuitry as shown and as will be described further below. One line 28 branching off of this normal power supply line 26 leads to a diode 30, biased in the direction indicated, after which diode 30 line 28 terminates at a junction point 32. This junction point 32 comprises the "uninterrupted power point" of the circuitry of the invention, and will be referred to again below.

Referring back to source 20 near the top of the drawing, a second pair of lines 34 feeds line power to an array of components 36 which comprise the stand-by or emergency power supply of the invention. Stand-by power supply 36 comprises a battery charger 38 which is constantly fed line power, and which "trickles" power to a parallel array of a battery 40 and a voltage regulator 42 via a pair of parallel lines 44 and 46. In this manner, the battery 40 is constantly held at its full charge. In the successfully constructed embodiment, regulator 42 is in parallel with elements 38 and 40 in order to drop and regulate the 12 volts from the battery to a stable 5.0 volts required at point 32, as will be further described below. Voltage regulator 42 and battery charger 38 via a line 48 and the line 44 mentioned above maintain a drive transistor 50 at a predetermined voltage. A line 52 from transistor 50 connects the drive transistor to the uninterrupted power point 32 and contains a diode 54, similar in structure to diode 30 described above, and arranged in opposite bias relationship to diode 30 as shown.

The components 24, 30, 38, 40, 42, 50 and 54, as well as all of the other individual electrical and electronic components described below, are conventional and well known in the art. Persons skilled in the art are easily able to choose a set of such components to build a suitable circuit depending upon their particular conditions and problem. Accordingly, the drive transistor 50 may not be required depending upon the nature of the particular voltage regulator 42 selected. The power supply 24 and the line 44 are suitably grounded in a suitable manner as indicated in the drawing.

A facet of the invention is that the two power supplies, normal supply 24 and emergency supply 36, are so adjusted that no surges or peaks or other harmful voltage or power perturbations are sensed at point 32 and all the other parts connected thereto. This desideratum is accomplished by setting array 36, and particularly voltage regulator 42 therein, at a level just about exactly the voltage or power required by the remaining components, and by setting power supply 24 slightly above that level. In the successfully constructed embodiment of the invention, the circuit operated at 5.0 volts. Array 36 was set at 5.0 volts and power supply 24 was set at 5.8 volts. Thus, under normal conditions, diode 30 is forwardly biased and diode 54 is reversedly biased. In the event of a power failure or other interruption causing the voltage on line 28 to fall below 5.0 volts, diode 54 will change and become forwardly biased, thereby maintaining the uninterrupted power point 32 at at least 5.0 volts. The transition is smooth and the remaining circuitry does not sense that the supply is shifted from 24 to 36, and conversely, later does not sense when power shifts back from emergency 36 to normal 24.

The remaining parts of the invention, described below, depend upon the existence of an uninterrupted power point 32, but not upon the specific components used to obtain it as described above. That is, the array of power supply 24 and standby power supply 36 with the diodes 30 and 54 in the manner shown is but one embodiment of apparatus for obtaining an uninterrupted power point, and the invention is not limited to this specific apparatus, but could be used with other arrangements. For example, 24 could be a larger capacity battery with its own charging system. Also, 24 could be a D.C. generator or any other source of D.C. power.

The successfully constructed embodiment, and the art in general, operate with voltage as the variable parameter in the power supply, rather than current, and for this reason this description will occasionally use the terms power and voltage interchangeably. As will be understood by those skilled in the art, the invention is not limited to voltage but may operate with current or power itself, in unusual circumstances, or if warranted for any other reason.

The pulses to be counted, from whatever source or multiple sources, enter the circuitry via an "or" gate 56 which is powered from the normal power supply line 26 via a branch line 58 thereof. As is well known, an "or" gate is a solid state logic component which produces a signal at its output when there is a signal at any one of its inputs. The output of "or" gate 56 is carried via a line 60 to an "and" gate 62, the output of which "and" gate corresponds to the line 18 of FIG. 1, i.e., the input to the counter 12. An "and" gate is a logic component which produces an output when there are input signals on all of its inputs, two inpus in the present case. The second input line 64 to "and" gate 62 branches and connects to both of the remaining two portions of the invention circuit, namely, a portion 66 which may be thought of as the power off inhibit circuit, and a portion 68 which may be thought of as the power on inhibit circuit. Most of the components in both portions 66 and 68 are powered or biased from the uninterrupted power point 32 via a multi-branching line 70 connected to said point 32.

The circuit portion 66 is the means which senses the failure of the normal power supply 24 and which thereupon isolates the counter 12 with respect to the incoming pulses on line 60 to thereby prevent spurious pulses which might be created by the source or sources 10 during the power failure from being counted. As is clear, the invention will function whether the power failure occurs at 24 or at 20. As far as the invention is concerned, both failures are equivalent. As an incidental matter, in the successfully constructed embodiment, sources 10 were powered from line 26 and had no standby power source. Portion 66 is built around a transistor 72, an array of two resistors 74 and an inverting gate 76 marked "INV" on the drawing. A current limiting resistor 75 is provided to protect transistor 72 in the usual manner. The two resistors 74 constitute a voltage dividing circuit, thereby providing a threshold at which transistor 72 will fire. This threshold, 5.0 volts in the successfully constructed embodiment, is the level when the emergency power supply 36 takes over and at which the counter is isolated. Transistor 72 also serves to protect the logic gates 76 and 62 from direct connection to the normal power line 26 via the branch line 78 to which the resistor array 74 is connected. Since a transistor inverts a signal, the gate 76 is provided to again invert the signal and feed it onto "and" gate 62 via its output line 80 which connects to input line 64. Another current limiting protective resistor 82 is provided as shown for the collector of transistor 72.

The circuit elements and the various polarities are so arranged that a signal is constantly present on line 80 during normal operation, thus enabling "and" gate 62 for operation each time a pulse to be counted is present on the other input line 60 to this gate. When normal power fails, the signal on line 80 fails due to firing of the transistor 72, thereby disabling "and" gate 62 and isolating the counter 12 from the raw data pulses on line 60. Gates 62 and 76, as well as the two components in the power on inhibit portion 68 described below, are connected to uninterrupted power point 32 via branches off of line 70 as shown.

The power on inhibit circuit 68 serves to sense the return of normal supply 24 to operation, and to thereupon re-enable gate 62, but only after the expiration of a predetermined time delay. The delay is required because upon resumption of normal power, operation of the transistor 72 and gate 76 would themselves immediately supply a pulse on line 80 and would thereupon immediately re-enable gate 62. An immediate re-activation of gate 62 would be undesirable because the pulse sources 10 and their associated gating logic will almost invariably experience a period of confused or sporadic operation upon being returned to normal power. Thus, the time delay assures that gate 62 is held in the disabled condition until the system has "settled down" and resumed normal operation. No pulses are lost during the "settling down" time because the length of time gate 62 is held disabled is quite small compared to the length of time an input signal is present. The time to re-enable can be easily determined by noting the typical delay times of the components in sources 10.

To this end then, portion 68 is in a line 84 connected to normal power supply line 26 via line 78, and comprises a current limiting protective resistor 86, an inverting gate 88, and a "one-shot" multivibrator 90 in series circuit. A model 9601 manufactured by either Fairchild or Motorola is preferred at 90. One-shot 90 is such that it will fire only in response to a falling signal. Thus, when normal power failed, inverter 88 produced a rising signal, and one-shot 26 did not activate and thus did not interfere with the disabling of gate 62 by portion 66 as described above. When normal power returns however, one-shot 90 immediately sees a falling signal due to the action of inverting gate 88 and immediately fires to ground line 64 and 80 to its internal ground 92, thereby holding gate 62 disabled. Some of the other components, such as 62, 76 and 88, have similar internal grounds, but these are not shown in that they play no additional function as to the invention. The grounded condition of lines 64 and 80 remains for a predetermined length of time determined by the reistance/capacitance circuit 94 connected to the one-shot 90 in the usual manner. The predetermined length of time can be easily changed by adjustments within RC circuit 94 in the usual manner.

While the invention has been described in detail above, it is to be understood that this detailed description is by way of example only, and the protection granted is to be limited only within the spirit of the invention and the scope of the following claims.

We claim:

1. In combination with at least one source of pulses to be counted and counting means for counting said pulses, the improvement comprising a normal power supply and a stand-by power supply, means to produce power in said stand-by power supply at a predetermined minimum level, means to produce power in said normal power supply at a level slightly greater than said predetermined minimum level, means to interconnect said two power supplies in opposition to one another so as to form an uninterrupted power point between said power supplies which will be always at at least said minimum level, means to supply power to said counting means from said point, an "and" gate having a pair of inputs, means to feed said pulses to be counted as one of the inputs of said "and" gate, means to supply an enabling signal as the other of the inputs of said "and" gate so long as said normal power supply is in normal operation and to sense the falling of said normal power supply to a level below said minimum level and to thereupon disable said other input to said "and" gate, and means to sense rising of power in said normal power supply to and above said minimum level, and means to thereupon hold said other input to said "and" gate disabled until the expiration of a predetermined time and to thereafter enable said other input to said "and" gate.

2. The combination of claim 1, said stand-by power supply comprising a battery charger connected to line power, and a battery and a voltage regulator connected in parallel circuit with said battery charger.

3. The combination of claim 1, said power supply interconnecting means comprising a pair of diodes arranged on opposite sides of said uninterrupted power point in oppositely biased relationship, whereby during normal operation the diode associated with said normal supply is forwardly biased and the other diode associated with said stand-by power supply is reversedly biased, and whereby the biasing of said diodes reverses during a failure of the normal power supply.

4. The combination of claim 1, wherein said means to supply an enabling signal and to sense falling of normal power comprises an array of a voltage dividing circuit and a transistor so chosen and so arranged that said transistor will cease supplying said enabling signal in the event said normal power supply falls below said predetermined minimum level.

5. The combination of claim 1, said means to sense rising power comprising a series circuit arrangement of signal inverting means, a one-shot multivibrator, and said other input to said "and" gate.

6. The combination of claim 5, said means to hold said other input disabled comprising RC circuit means operatively cooperable with said one-shot multivibrator to set said predetermined time.

7. A method of interconnecting a utility to be serviced with a normal power supply, a stand-by power supply, and a source of pulses to be counted, comprising the steps of interconnecting the normal power supply and the stand-by power supply in such a way as to create an uninterrupted power point, connecting said utility to said point, connecting said pulse source to said utility via a power off inhibit circuit portion and a power on inhibit circuit portion, causing said power off inhibit portion to immediately break the connection between said utility and said pulse source upon failure of said power supply to thereby isolate said utility from said pulse source and causing said power on inhibit portion to reconnect said utility and said pulse source upon resumption of operation of said normal power supply and after the expiration of a predetermined time.

8. The method of claim 7, and connecting the components in both said power on and power off inhibit circuit portions to said point for powering said components.

9. The method of claim 7, connecting said power on inhibit circuit portion to said normal power supply, inverting the signal from power supply, and causing said power on inhibit portion to respond to only a falling signal, whereby said power on inhibit portion does not interfere with the prior operation of said power off inhibit portion.

* * * * *

UNITED STATES PATENT OFFICE
CERTIFICATE OF CORRECTION

Patent No. 3,757,131  Dated September 4, 1973

Inventor(s) Ronald L. Krutz and Thomas J. Villella

It is certified that error appears in the above-identified patent and that said Letters Patent are hereby corrected as shown below:

In the Abstract, line 6, after "supply", insert --while simultaneously switching to the emergency power supply--.

Signed and sealed this 5th day of March 1974.

(SEAL)
Attest:

EDWARD M. FLETCHER, JR.
Attesting Officer

C. MARSHALL DANN
Commissioner of Patents